US010809712B1

(12) United States Patent
Schaffalitzky

(10) Patent No.: US 10,809,712 B1
(45) Date of Patent: *Oct. 20, 2020

(54) HUMAN INTERACTION WITH UNMANNED AERIAL VEHICLES

(71) Applicant: Amazon Technologies, Inc., Seattle, WA (US)

(72) Inventor: Frederik Schaffalitzky, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 329 days.

This patent is subject to a terminal disclaimer.

(21) Appl. No.: 15/886,755

(22) Filed: Feb. 1, 2018

Related U.S. Application Data

(63) Continuation of application No. 15/213,307, filed on Jul. 18, 2016, now Pat. No. 9,921,579, which is a continuation of application No. 14/500,645, filed on Sep. 29, 2014, now Pat. No. 9,459,620.

(51) Int. Cl.
| | |
|---|---|
| *G05D 1/00* | (2006.01) |
| *B64D 1/10* | (2006.01) |
| *B64C 39/02* | (2006.01) |
| *B64D 31/06* | (2006.01) |

(52) U.S. Cl.
CPC ......... *G05D 1/0016* (2013.01); *B64C 39/024* (2013.01); *B64D 1/10* (2013.01); *B64D 31/06* (2013.01); *G05D 1/0022* (2013.01); *G05D 1/0094* (2013.01); *B64C 2201/128* (2013.01); *B64C 2201/14* (2013.01)

(58) Field of Classification Search
CPC .. G05D 1/0016; G05D 1/0022; G05D 1/0094; G05D 1/00; B64D 1/10; B64D 1/12; B64D 31/04; B64D 31/06; G06Q 10/083; B64C 39/024; B64C 2201/128; B64C 2201/14
USPC .......... 701/2–18, 120, 23, 25; 702/152, 153; 244/189, 190, 195, 196; 382/103, 382/115–128; 700/59, 245
See application file for complete search history.

(56) References Cited

U.S. PATENT DOCUMENTS

| | | | | |
|---|---|---|---|---|
| 7,510,142 | B2 * | 3/2009 | Johnson | B64C 39/022 244/17.11 |
| 7,610,841 | B2 * | 11/2009 | Padan | B64D 1/04 244/118.1 |
| 8,434,920 | B2 * | 5/2013 | Jones | F42B 12/42 362/470 |

(Continued)

OTHER PUBLICATIONS

U.S. Appl. No. 14/500,645, "Non-Final Office Action", dated Nov. 6, 2015, 26 pages.

(Continued)

*Primary Examiner* — Shardul D Patel
(74) *Attorney, Agent, or Firm* — Kilpatrick Townsend & Stockton LLP

(57) ABSTRACT

In some examples, an unmanned aerial vehicle is provided. The unmanned aerial vehicle may include a propulsion device, a sensor device, and a management system. In some examples, the management system may be configured to receive sensor information associated with visible human gestures via the sensor device and, in response, instruct the propulsion device to perform an action associated with an identified visible human gesture.

20 Claims, 10 Drawing Sheets

(56) References Cited

U.S. PATENT DOCUMENTS

| | | | | |
|---|---|---|---|---|
| 8,761,964 | B2* | 6/2014 | Lee | B64C 39/024 |
| | | | | 701/2 |
| 8,948,935 | B1* | 2/2015 | Peeters | B64C 39/024 |
| | | | | 701/3 |
| 8,952,889 | B2* | 2/2015 | Jacobsen | H04W 88/06 |
| | | | | 345/156 |
| 9,043,052 | B2* | 5/2015 | So | G01C 23/00 |
| | | | | 701/3 |
| 9,044,543 | B2* | 6/2015 | Levien | G05D 1/00 |
| 9,061,102 | B2* | 6/2015 | Levien | G05D 1/0011 |
| 9,083,425 | B1* | 7/2015 | Frolov | G05D 1/104 |
| 9,087,451 | B1* | 7/2015 | Jarrell | G08G 5/0069 |
| 9,459,620 | B1* | 10/2016 | Schaffalitzky | G05D 1/0016 |
| 9,921,579 | B1* | 3/2018 | Schaffalitzky | G05D 1/0016 |
| 2013/0253733 | A1* | 9/2013 | Lee | B64C 39/024 |
| | | | | 701/2 |
| 2014/0032034 | A1* | 1/2014 | Raptopoulos | G05D 1/0088 |
| | | | | 701/25 |

OTHER PUBLICATIONS

U.S. Appl. No. 14/500,645 , "Notice of Allowance", dated May 24, 2016, 16 pages.

U.S. Appl. No. 15/213,307, U.S. Patent Application, filed Jul. 18, 2016, Titled: Human Interaction With Unmanned Aerial Vehicles.

U.S. Appl. No. 15/213,307 , "Final Office Action", dated Sep. 12, 2017, 12 pages.

U.S. Appl. No. 15/213,307 , "Non-Final Office Action", dated Mar. 27, 2017, 32 pages.

U.S. Appl. No. 15/213,307 , "Notice of Allowance", dated Nov. 14, 2017, 9 pages.

* cited by examiner

HUMAN INTERACTION WITH UNMANNED AERIAL VEHICLES

CROSS REFERENCE TO RELATED APPLICATIONS

This application is a continuation of U.S. patent application Ser. No. 15/213,307, filed Jul. 18, 2016, entitled "HUMAN INTERACTION WITH UNMANNED AERIAL VEHICLES", issued as U.S. Pat. No. 9,921,579 on Mar. 2, 2018, which is a continuation of U.S. patent application Ser. No. 14/500,645, filed on Sep. 29, 2014, entitled "HUMAN INTERACTION WITH UNMANNED AERIAL VEHICLES," issued as U.S. Pat. No. 9,459,620 on Oct. 4, 2016, the contents of which are herein incorporated by reference in their entireties.

BACKGROUND

A delivery service may deliver items to its customers using one of a variety of different means. For example, an item ordered by a customer from an electronic marketplace may be removed from a shelf in a warehouse by a human picker, loaded into a semi-truck, transferred to a delivery van, and delivered to the customer's doorstep by a delivery person. In some cases, the item may also be transported using a plane, a train, a motorcycle, a bicycle or any combination of the foregoing.

BRIEF DESCRIPTION OF THE DRAWINGS

Various embodiments in accordance with the present disclosure will be described with reference to the drawings, in which.

DETAILED DESCRIPTION

Figure 1:
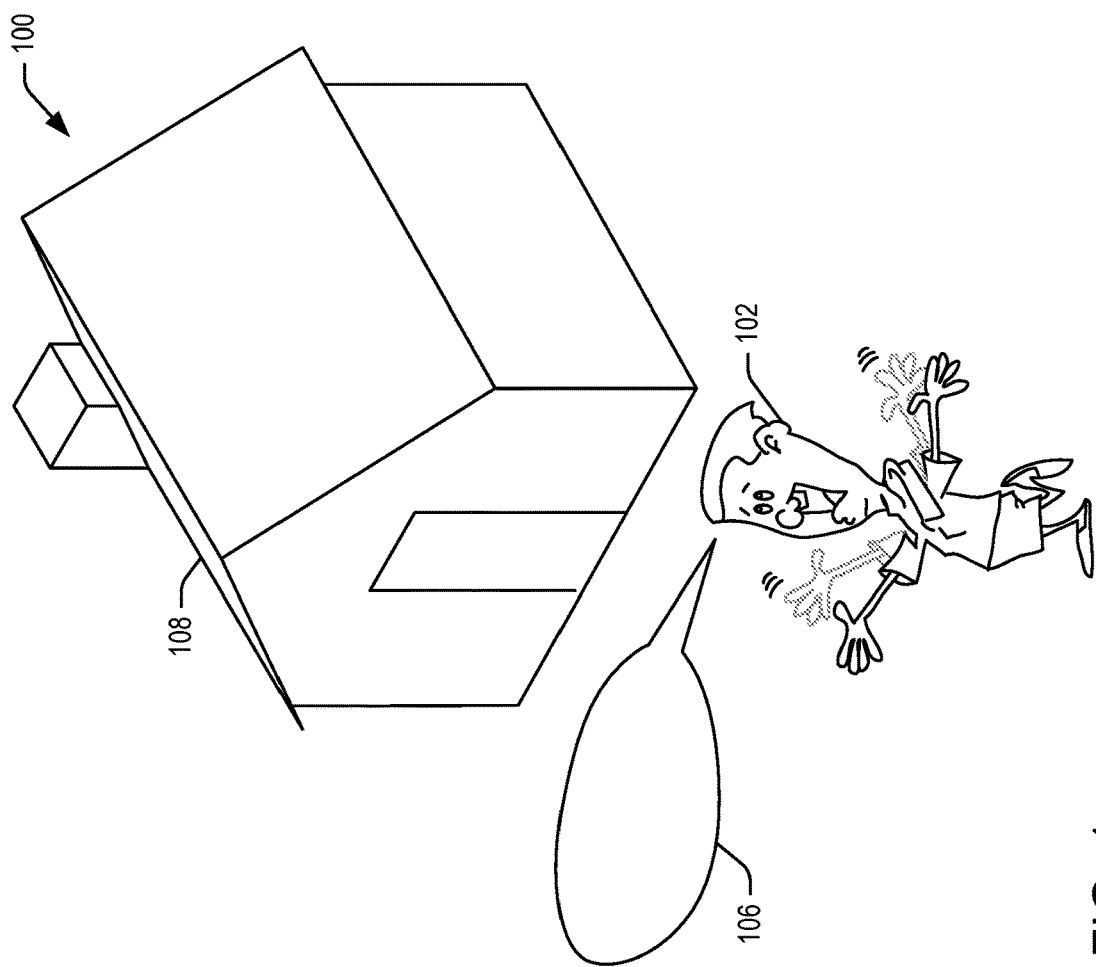
FIG. 1 is an example environment for implementing techniques relating to human interaction with unmanned aerial vehicles as described herein, according to at least one example.
Figure 1:
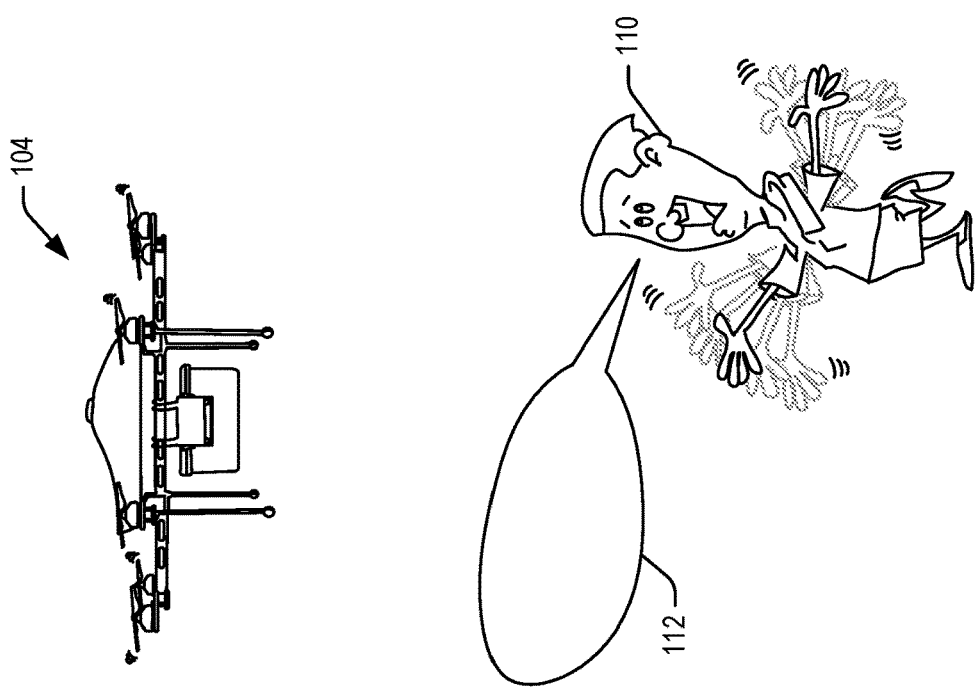

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques relating to human interaction with unmanned aerial vehicles. In particular, this specification will discuss techniques in relation to interaction with unmanned aerial delivery vehicles. The techniques, however, may be applicable to interaction with other unmanned vehicles, whether aerial or otherwise or intended for delivery or otherwise. In the context of this specification, unmanned aerial vehicles may be configured to recognize human interaction for safety purposes (e.g., to avoid a collision), for navigation or direction purposes (e.g., to instruct the vehicles to come closer or drop a package), and for any other suitable purpose (e.g., for training of the vehicle to interpret human interaction). Types of human interaction with unmanned aerial vehicles contemplated may include any suitable combination of human gestures capable of recognition by unmanned aerial vehicles. As will be discussed in more detail below, examples of such human gestures may include visual gestures, audible gestures, and other gestures capable of recognition by unmanned aerial vehicles. Unmanned aerial vehicles may be configured to recognize such human gestures using one or more sensors.

In one example, an unmanned aerial vehicle may be configured at least to recognize human gestures and to deliver packages. The vehicle may access a delivery plan that includes a delivery location associated with a human recipient. As the vehicle makes its way to the delivery location, it may come upon the human recipient and/or other humans. The human recipient and/or the other humans can communicate with the vehicle using human gestures to aid the vehicle along its path to the delivery location. An onboard management system of the vehicle can process the human gestures and instruct the vehicle to perform certain actions. To process a particular human gesture, the vehicle receives the gesture using one of its sensors, compares the received gesture with those in a database of human gestures, determines an action to take based on the comparison, and instructs the appropriate subsystem to take the action. For instance, the other humans may gesture by waving their arms in a shooing manner as the vehicle approaches them. Based on these gestures, the vehicle may determine that such gestures indicate that it should not proceed further in the direction of the other humans. Accordingly, the vehicle may instruct its propulsion subsystem to adjust its trajectory and/or speed, or otherwise adjust or modify the vehicle's behavior. On the other hand, the human recipient may wave his arms in an inviting manner as the vehicle approaches. This may be interpreted by the vehicle as an instruction to land and deliver the package. Thus, the vehicle may instruct its delivery subsystem to execute delivery of the package. The identity of the human recipient may be verified in some manner prior to delivery of the package.

Turning now to the figures, FIG. 1 illustrates environment 100 for implementing techniques relating to human interaction with unmanned aerial vehicles as described herein, according to at least one example. The environment 100 may include human user 102 and unmanned aerial vehicle (UAV) 104. As will be discussed in more detail, the UAV 104 may be configured for delivery of packages. The human user 102 may have previously requested delivery of a package to user home 108 using the UAV 104. Thus, the human user 102 may have reason to expect and/or anticipate the arrival and/or presence of the UAV 104. This may, in some examples, influence the gestures that the human user 102 makes in response to seeing the UAV 104. In some examples, the UAV 104 may encounter a different human user (e.g., human user 110) who may not have requested delivery by the UAV 104 or may be a bystander, and may not therefore have reason to expect and/or anticipate the arrival and/or presence of the UAV 104. This may ultimately influence the gestures that the human user 110 may perform in response to seeing the UAV 104. For example, the human user 110 may gesture by waving his or her arms in the direction of the UAV 104 in an unwelcoming manner or by making verbal gestures as illustrated in voice bubble 112. Returning to the human user 102, as the UAV 104 approaches the human user 102 and/or the user home 108, the human user 102 may signal the UAV 104 using one or more gestures. The one or more gestures may include visual gestures (e.g., waving arms, flashing of lights, pointing), audible gestures (e.g., speech), and other gestures capable of recognition by the UAV 104. The human user 102 is shown illustrating a visual gesture (e.g., waving arms) and an audible gesture (e.g., speaking (illustrated by voice bubble 106)). These gestures may be received by the UAV 104, processed by its management system, and used to adjust its behavior (e.g., change its flight path in any direction, deliver its payload, communicate with the human user 102, and other similar actions).

Figure 2:
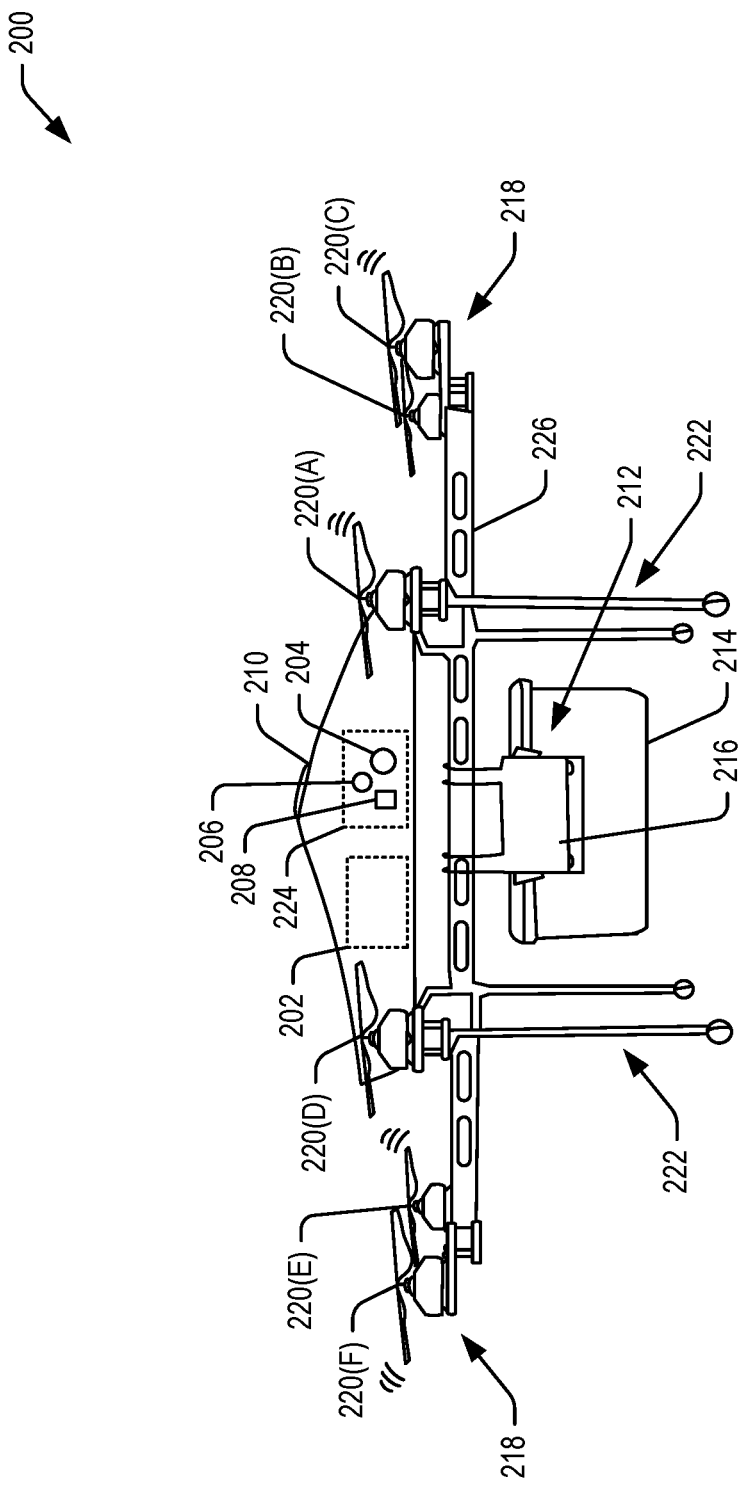
FIG. 2 is an example device for implementing techniques relating to human interaction with unmanned aerial vehicles as described herein, according to at least one example.

Turning next to FIG. 2, in this figure is illustrated an example UAV 200 for implementing techniques relating to human interaction with unmanned aerial vehicles as described herein, according to at least one example. The UAV 200 is an example of the UAV 104 discussed with reference to FIG. 1. The UAV 200 may be designed in accordance with commercial aviation standards and may include multiple redundancies to ensure reliability. For purposes of this specification, the UAV 200 may include a plurality of systems or subsystems operating under the control of, or at least partly under the control of, a management system 202. The management system 202 may include an onboard computer for autonomously or semi-autonomously controlling and managing the UAV 200 and, in some examples, for enabling remote control by a pilot. The onboard computer will be discussed in more detail with reference to FIG. 3. Portions of the management system 202, including the onboard computer, may be housed under top cover 210. As used herein, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), radio-frequency identification (RFID) capability (not shown), and interfaces capable of speech interpretation and recognition (not shown).

The UAV 200 may also include a communication system 224 housed within the top cover 210. The communication system 224 may include one or more light sensors 204 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 206 (e.g., microphone, noise filters, and other sensors for capturing sound), and one or more output devices 208 (e.g., microphone, speaker, laser projector, light projector, and other devices for outputting communication information). The management system 202 may be configured to receive information and provide information via components of the communication system 224. For example, information may be received (e.g., human gestures) via the light sensor 204 and the auditory sensor 206 and information may be provided (e.g., verbal statements, requests, or questions using the speech interface, flashing lights, and other ways discussed herein for providing information) via the output device 208. Thus, in some examples, the UAV 200 may support two-way communication with users. Two-way communication may be beneficial for verifying a potential recipient's identity, for posing questions to a potential recipient or to other human users, and for providing instructions to a potential recipient or to other users, e.g., relating to delivery of a package. In some examples, the communication system 224 may operate semi-autonomously or autonomously.

As shown in FIG. 2, the UAV 200 may also include a retaining system 212. The retaining system 212 may be configured to retain payload 214. In some examples, the retaining system 212 may retain the payload 214 using friction, vacuum suction, opposing arms, magnets, and other retaining methods. As illustrated in FIG. 2, the retaining system 212 may include two opposing arms 216 (only one is illustrated) configured to retain the payload 214. The management system 202 may be configured to control at least a portion of the retaining system 212. In some examples, the retaining system 212 may be configured to release the payload 214 in one of a variety of ways. For example, the retaining system 212 (or other system of the UAV 200) may be configured to release the payload 214 with a winch and spool system, by the retaining system 212 releasing the payload, and other methods of releasing the payload. In some examples, the retaining system 212 may operate semi-autonomously or autonomously.

In FIG. 2, the payload 214 is illustrated as a delivery box. In some examples, the delivery box may include one or more packages or items intended for delivery to a recipient using the techniques described herein. The payload 214, whether as a delivery box or otherwise, may be configured for delivery using a variety of different methods. For example, the payload 214 may include a parachute that opens and slows the payload's 214 descent as it falls to its delivery location. In some examples, the payload 214 may include padding surrounding its package to reduce the impact of a drop from the UAV 200 above the ground. The UAV 200 may also deliver the payload 214 by fully landing on the ground and releasing the retaining system 212.

Further, the UAV 200 may include propulsion system 218. In some examples, the propulsion system 218 may include rotary blades or otherwise be a propeller-based system. In some examples, the propulsion system 218 may include or be associated with one or more fixed wings. As illustrated in FIG. 2, the propulsion system 218 may include a plurality of propulsion devices, a few of which, 220(A)-220(F), are shown in this view. Each propeller device may include one propeller, a motor, wiring, a balance system, a control mechanism, and other features to enable flight. In some examples, the propulsion system 218 may operate at least partially under the control of the management system 202. In some examples, the propulsion system 218 may be configured to adjust itself without receiving instructions from the management system 202. Thus, the propulsion system 218 may operate semi-autonomously or autonomously. The propulsion system 218 may enable multi-directional flight of the UAV 200 (e.g., by adjusting each propeller device individually). In this manner, the UAV 200 may be configured to respond to human interaction by adjusting the features of the propulsion system 218. The UAV 200 may also include landing structure 222. The landing structure 222 may be adequately rigid to support the UAV 200 and the payload 214. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226.

Figure 3:
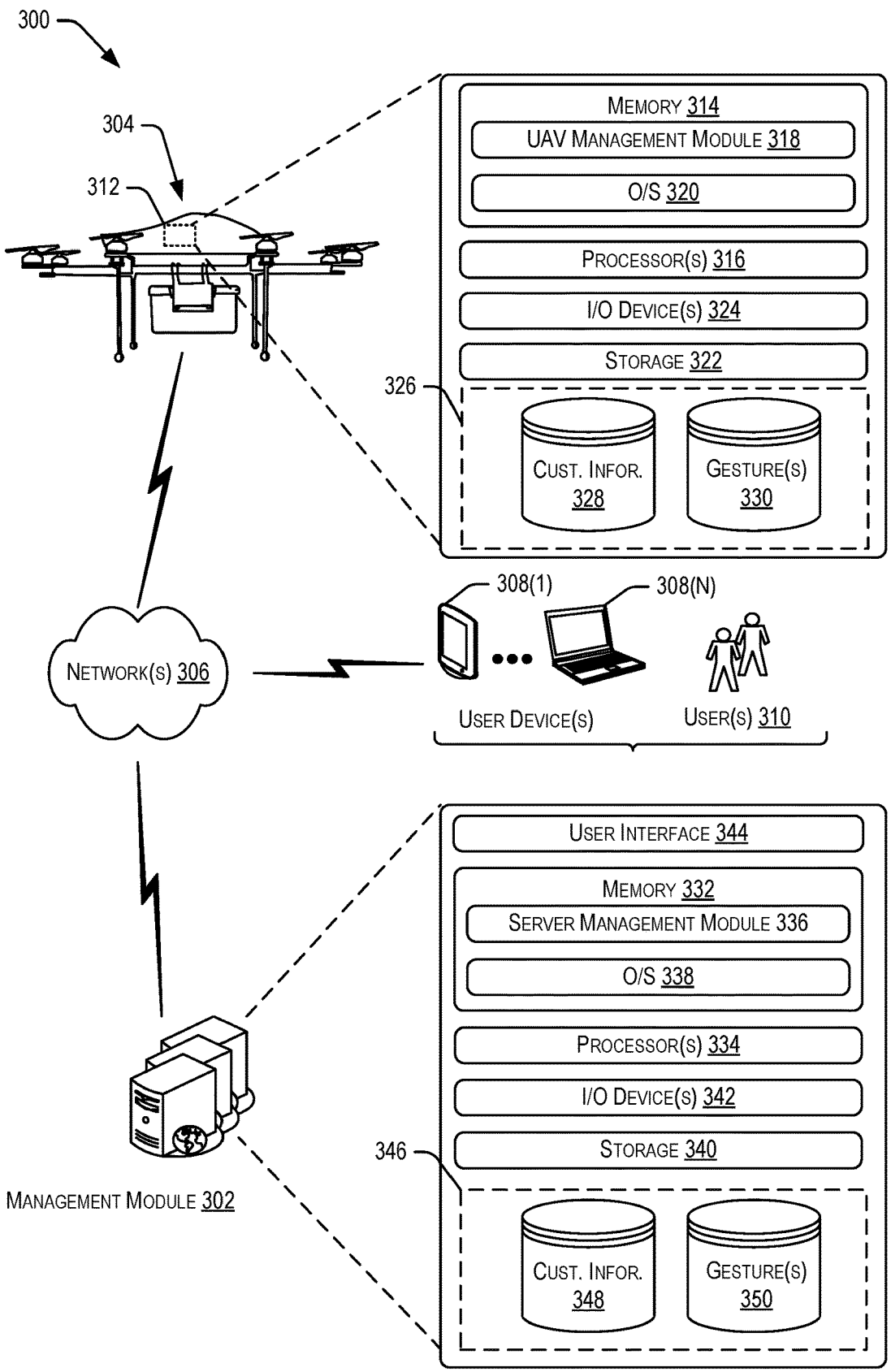
FIG. 3 is an example schematic architecture and devices for implementing techniques relating to human interaction with unmanned aerial vehicles as described herein, according to at least one example.

Turning next to FIG. 3, in this figure is illustrated an example schematic architecture 300 for implementing techniques relating to human interaction with unmanned aerial vehicles as described herein, according to at least one example. The architecture 300 may include a management module 302. The management module 302 may be included as part of an electronic marketplace (not shown) and interface with purchase and delivery services of the electronic marketplace. In this manner, the management module 302 may coordinate delivery of items via UAVs, such as UAV 304, to customers of the electronic marketplace. The UAV 304 is an example of the UAV 200 discussed previously. In some examples, the management module 302 may be a stand-alone service operated on its own or in connection with an electronic marketplace. In either example, the management module 302 may be in communication with the UAV 304 via one or more network(s) 306 (hereinafter, "the network 306"). The network 306 may include any one or a combination of many different types of networks, such as cable networks, the Internet, wireless networks, cellular networks, radio networks, and other private and/or public networks. Thus, the management module 302 may be configured to provide back-end control of the UAV 304 prior to, during, and after completion of its delivery plan. As discussed previously, in some examples, the UAV 304 may be configured to accomplish its delivery plan (e.g., deliver its payload) with little to no communication with the management module 302.

User devices 308(1)-308(N) (hereinafter, "the user device 308") may also be in communication with the management module 302 and the UAV 304 via the network 306. The user device 308 may be operable by one or more human users 310 (hereinafter, "the human user 310") to access the management module 302 (or an electronic marketplace) and the UAV 304 via the network 306. In some examples, such connectivity may enable the human user 310 to interact with the UAV 304 according to techniques described herein. The user device 308 may be any suitable device capable of communicating with the network 306. For example, the user device 308 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 308 may be in communication with the management module 302 via one or more web servers constituting an electronic marketplace (not shown) connected to the network 306 and associated with the management module 302.

Turning now to the details of the UAV 304, the UAV 304 may include an onboard computer 312 including at least one memory 314 and one or more processing units (or processor(s)) 316. The processor(s) 316 may be implemented as appropriate in hardware, computer-executable instructions, software, firmware, or combinations thereof. Computer-executable instruction, software or firmware implementations of the processor(s) 316 may include computer-executable or machine-executable instructions written in any suitable programming language to perform the various functions described. The memory 314 may include more than one memory and may be distributed throughout the onboard computer 312. The memory 314 may store program instructions (e.g., UAV management module 318) that are loadable and executable on the processor(s) 316, as well as data generated during the execution of these programs. Depending on the configuration and type of memory including the UAV management module 318, the memory 314 may be volatile (such as random access memory (RAM)) and/or non-volatile (such as read-only memory (ROM), flash memory, or other memory). The UAV management module 318 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM. Turning to the contents of the memory 314 in more detail, the memory 314 may include an operating system 320 and one or more application programs, modules or services for implementing the features disclosed herein including at least the UAV management module 318.

In some examples, the onboard computer 312 may also include additional storage 322, which may include removable storage and/or non-removable storage. The additional storage 322 may include, but is not limited to, magnetic storage, optical disks, and/or tape storage. The disk drives and their associated computer-readable media may provide non-volatile storage of computer-readable instructions, data structures, program modules, and other data for the computing devices.

The memory 314 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 312.

The modules of the onboard computer 312 may include one or more components. The onboard computer 312 may also include input/output (I/O) device(s) and/or ports 324, such as for enabling connection with a keyboard, a mouse, a pen, a voice input device, a touch input device, a display, speakers, a printer, or other I/O device. The I/O device(s) 324 may enable communication with the other systems of the UAV 304 (e.g., other parts of the control system, power system, communication system, navigation system, propulsion system, and the retaining system).

The onboard computer 312 may also include data store 326. The data store 326 may include one or more databases, data structures, or the like for storing and/or retaining information associated with the UAV 304. In some examples, the data store 326 may include databases, such as customer information database 328 and gestures database 330. Within the customer information database 328 may be stored any suitable customer information that may be used by the UAV 304 in implementing and/or affecting its delivery plan. For example, the customer information database 328 may include profile characteristics for the human user 310. The profile characteristics may include a shipping address and one or more delivery characteristics. For example, a delivery characteristic may indicate that, during delivery, the human user 310 prefers to meet the UAV 304 at a specific time and guide it to the ground using particular gestures. Other examples of delivery characteristics may include: gestures commonly used by the human user 310 while interacting with the UAV 304, historical information relating to the delivery of items by the UAV 304 to the human user 310, delivery vehicle preferences, and other characteristics relating to delivery of packages to the human user 310. Based on the information from the customer information database 328, the UAV 304 may increase its predictability with respect to the human user 310, thus improving overall customer experience.

Within the gestures database 330 may be stored gestures capable of recognition by the UAV 304. Associated with each gesture or groups of gestures may be instructions or information that can be used by the UAV management module 318 to determine instructions to take when a human gesture is received that matches one or more gestures from the gestures database 330. For example, certain gestures (e.g., waving of one's arms aggressively in front of one's face, covering of one's head with one's arms, moving of one's arms in a shooing fashion (e.g., as one would shoo a flock of birds), and other similar gestures) may, when processed, result in the onboard computer 312 instructing the UAV 304 to adjust its behavior in some manner (e.g., aborting its delivery plan, adjusting one or more aspects of its delivery plan, adjusting the trajectory of its flight path associated with its delivery plan, performing one or more routines, performing one or more similar operations in response to processing the gesture, and other similar behavior adjustments). Alternatively, certain gestures (e.g., waving of one's arms in an parallel directing manner (e.g., as one would direct street traffic or motion to a pilot in a cockpit of a plane), waving of one's arms in an inviting manner, pointing at particular location(s), and other similar gestures) may, when processed, result in the onboard computer 312 instructing the UAV 304 to land, deliver its payload, or in some way interact with the human making the gestures.

Turning now to the details of the user device 308. The user device 308 may be used by the human user 310 for interacting with the management module 302 and, in some cases, the UAV 304. The user device 308 may therefore include a memory, a processor, a user-interface, a web-service application, and any other suitable feature to enable communication with the features of architecture 300. The web service application may be in the form of a web browser, an application programming interface (API), virtual computing instance, or other suitable application. In some examples, when the management module 302 is part of, or shares an association with, an electronic marketplace, the user device 308 may be used by the human user 310 for procuring one or more items from the electronic marketplace. The human user 310 may request delivery of the purchased item(s) using the UAV 304, or the management module 302 may coordinate such delivery on its own. In some examples, the human user 310 may use the user device 308 to direct the UAV 304 during delivery and/or to authenticate its identity prior to the UAV 304 delivering its payload. For example, the human user 310 may make a first gesture to direct the UAV 304 to move to the human user's 310 direction, make a second gesture or otherwise interact with the UAV 304 to authenticate the identity of the human user 310, and make a third gesture to direct the UAV 304 to deliver its payload.

Turning now to the details of the control service 302. The management module 302 may include one or more service provider computers, perhaps arranged in a cluster of servers or as a server farm, and may host web service applications. These servers may be configured to host a website (or combination of websites) viewable via the user device 308. The management module 302 may include at least one memory 332 and one or more processing units (or processor (s)) 334. The processor(s) 334 may be implemented as appropriate in hardware, computer-executable instructions, software, firmware, or combinations thereof. Computer-executable instruction, software or firmware implementations of the processor(s) 334 may include computer-executable or machine-executable instructions written in any suitable programming language to perform the various functions described. The memory 332 may include more than one memory and may be distributed throughout the management module 302. The memory 332 may store program instructions (e.g., server management module 336) that are loadable and executable on the processor(s) 334, as well as data generated during the execution of these programs. Depending on the configuration and type of memory including the server management module 336, the memory 332 may be volatile (such as random access memory (RAM)) and/or non-volatile (such as read-only memory (ROM), flash memory, or other memory). The management module 302 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM. Turning to the contents of the memory 332 in more detail, the memory 332 may include an operating system 338 and one or more application programs, modules or services for implementing the features disclosed herein including at least the server management module 336. The server management module 336, in some examples, may function similarly to the UAV management module 318. For example, when the UAV 304 is in network communication with the management module 302, the UAV 304 may receive at least some instructions from the management module 302 as the server management module 336 is executed by the processors 334. In some examples, the UAV 304 executes the UAV management module 318 to operate independent of the management module 302.

In some examples, the management module 302 may also include additional storage 340, which may include removable storage and/or non-removable storage. The additional storage 340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the management module 302. The modules of the management module 302 may include one or more components. The management module 302 may also include input/output (I/O) device(s) and/or ports 342, such as for enabling connection with a keyboard, a mouse, a pen, a voice input device, a touch input device, a display, speakers, a printer, or other I/O device.

In some examples, the management module 302 may include a user interface 344. The user interface 344 may be utilized by an operator, or other authorized user to access portions of the management module 302. In some examples, the user interface 344 may include a graphical user interface, web-based applications, programmatic interfaces such as application programming interfaces (APIs), or other user interface configurations. The management module 302 may also include data store 346. The data store 346 may include one or more databases, data structures, or the like for storing and/or retaining information associated with the management module 302. The data store 346 may include databases, such as customer information database 348 and gestures database 350. The customer information database 348 and the gestures database 350 may include similar information as the customer information database 328 and the gestures database 330 of the onboard computer 312. The management module 302 may store a larger amount of information in the data store 346 than the onboard computer 312 is capable of storing in the data store 326. Thus, in some examples, at least a portion of the information from the databases in the data store 346 is copied to the databases of the data store 326, e.g., periodically, occasionally, in connection with an event, or otherwise. In this manner, the data store 326 may have up-to-date information, without having to maintain the databases. In some examples, this information may be transferred as part of a delivery plan prior to the UAV 304 beginning a delivery mission.

Figure 4:
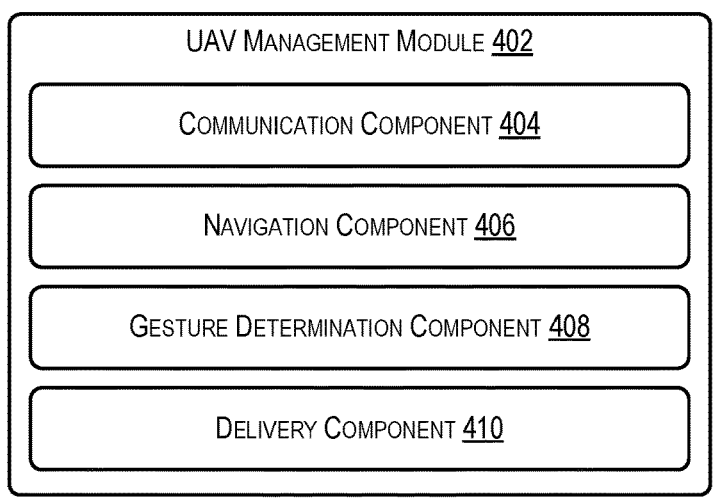
FIG. 4 is an example schematic device for implementing techniques relating to human interaction with unmanned aerial vehicles as described herein, according to at least one example.

Turning next to the details of the UAV management module 318 stored in the memory 314 of the onboard computer 312, in FIG. 4, example schematic device 400 is illustrated including UAV management module 402. The UAV management module 402 is an example of the UAV management module 318 and the server management module 336. The UAV management module 402 will be described from the reference point of an example UAV, but its function is not limited to controlling a UAV. The UAV management module 402 may be configured to manage one or more sub-modules, components, and/or services directed to embodiments disclosed herein. In some examples, the UAV management module 402 may include a communication component 404, a navigation component 406, a gesture determination component 408, and a delivery component 410. While these modules and components are illustrated in FIG. 4 and will be described as performing discrete tasks, it is understood that FIG. 4 illustrates example configurations and other configurations performing other tasks and/or similar tasks as those described herein may be implemented according to the techniques described herein. Other modules (not shown) may perform the same tasks as the UAV management module 402 or other tasks and may be implemented in a similar fashion or according to other configurations. Generally, the communication component 404 may be configured to manage communications between UAVs and a control service, between UAVs and user devices, between multiple UAVs, and/or any other communications. The navigation component 406 may be configured to implement at least portions of the delivery plan relating to navigation. For example, the navigation component 406 may calculate, adjust, receive, or determine coarse positioning or navigation instructions and fine positioning or navigation instructions. This may include, in some examples, determining trajectory adjustments to a flight path of a UAV. The gesture determination component 408, for example, may be configured to receive gestures, access stored gestures, compare the received gestures with the accessed gestures, and determine one or more actions to perform based on the comparison. The delivery component 410 may be configured to implement at least portions of the delivery plan relating to item delivery. For example, the delivery component 410 may be configured to verify a human user's identity and, once verified, execute delivery of items.

Figure 5:
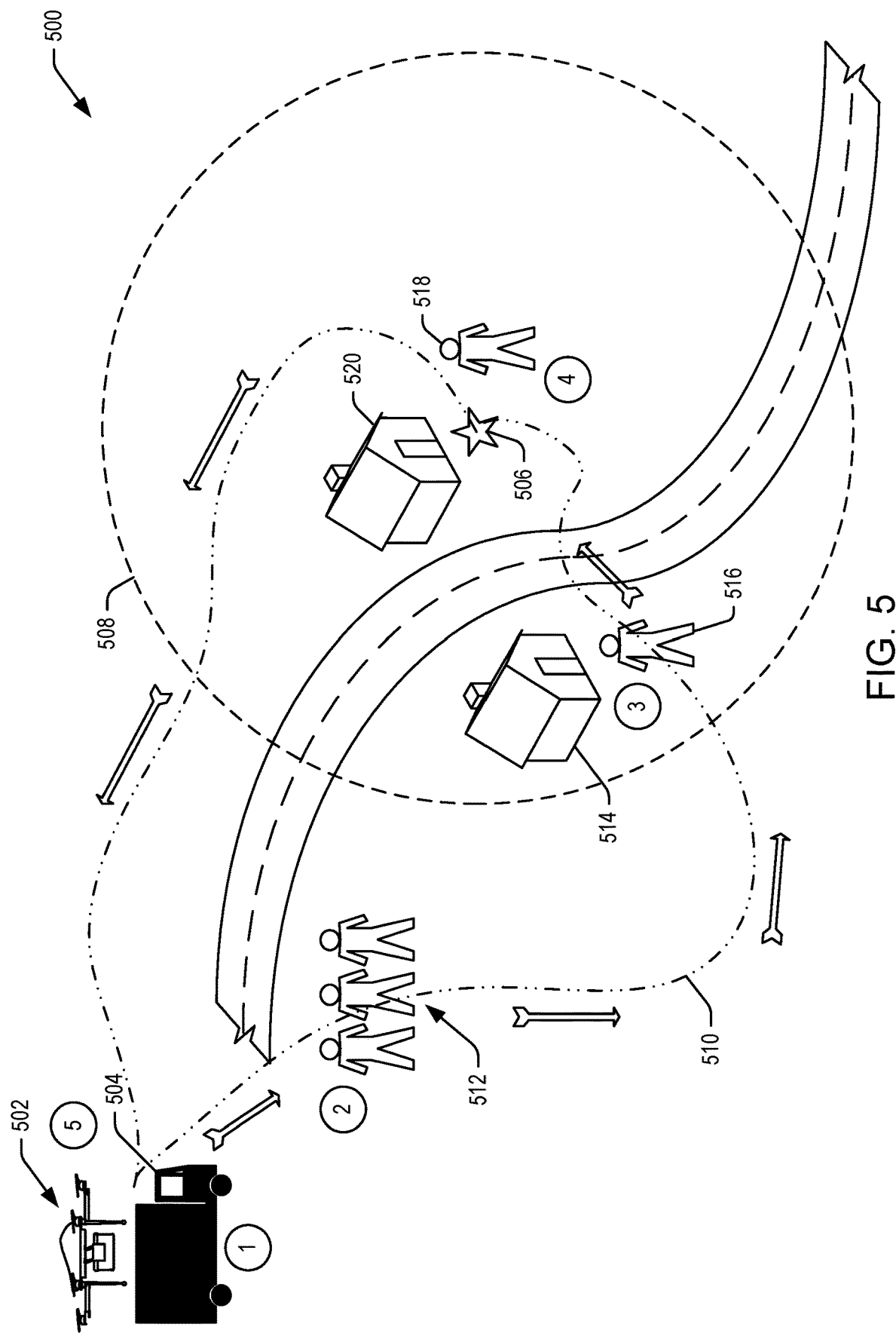
FIG. 5 is an example diagram depicting techniques relating to human interaction with unmanned aerial vehicles as described herein, according to at least one example.

Turning next to FIG. 5, this figure illustrates an example diagram 500 depicting techniques relating to human interaction with unmanned aerial vehicles as described herein, according to at least one example. Specifically, the diagram 500 illustrates the execution of an example delivery plan of UAV 502. The UAV 502 is an example of the UAV 200. An example flight path 510 of the UAV 502 is illustrated using the dot-dot-dashed line. The direction of the UAV 502 along the flight path 510 is illustrated by the plurality of arrows. The encircled numbers 1-5 illustrate locations along the flight path 510, and are for discussion purposes. The flight path 510 may be an example of a flight path that the UAV 502 may take in delivering a package to human user 518 who resides at home 520. Turning now to location 1, the UAV 502 is shown resting on vehicle 504. In some examples, the vehicle 504 may be used as a home base for the UAV 502. In some examples, the vehicle 504 may receive a delivery plan while resting on the vehicle 504, while in flight, or at some other time. An example delivery plan may include coarse positioning, fine positioning, and delivery decision making. The coarse positioning may include GPS coordinates, directions to GPS coordinates, and/or an address of the home 520. The GPS coordinates may correspond to an anticipated delivery location, such as delivery location 506. However, because the accuracy of GPS coordinates and GPS systems can be imprecise, in some examples, coarse positioning (i.e., navigation at a coarse level of accuracy) may be used until the UAV 502 is within a specified range of the delivery location 506 that may approximately correlate to a range of the GPS system's accuracy. For example, circle 508 may illustrate an example accuracy range for a GPS system based on the delivery location 506. In some examples, once the UAV 502 crosses within the circle 508 it may switch to fine positioning (i.e., navigation via other positioning systems having a finer level of accuracy than the coarse positioning).

Returning to the flight path 510, the UAV 502 may leave the vehicle 504 and come upon human group 512 at location 2. In some examples, the UAV 502 may, as a safety mechanism or otherwise, be configured to watch for human gestures as it proceeds along its flight path 510. If the UAV 502 flies close by the human group 512, the UAV 502 may be able to receive one or more human gestures from a plurality of users that form the group. For example, the UAV 502 may pass nearby the human group 512 as a result of a malfunction to one of the UAV's systems, because of an unforeseen circumstance (e.g., weather conditions), or as part of a planned flight plan. In any case, the plurality of users that form the human group 512 are not likely expecting the UAV 502, and may therefore make gestures in its direction to prevent the UAV 502 from coming too close. These gestures may be received by the UAV 502 and ultimately result in the UAV 502 adjusting its behavior, e.g., adjusting the trajectory of its flight path 510, based on at least one gesture. The at least one gesture may be, in some examples, representative of some or all of the received gestures. In some examples, the at least one gesture may be determined based on an average of the received gestures, a greatest number of common gestures from the plurality of users, a selection of the gesture based on some relative ranking and/or weighting among gestures (e.g., if any of the gestures indicates to stay away, then the UAV 502 may stay away, even if every other gesture indicates for the UAV 502 to come closer and deliver), a selection of a default gesture to adjust behavior (e.g., abort) when gestures are received from a plurality of users (e.g., to keep the UAV 502 from encountering a group), or other similar determination techniques. Thus, in some examples, the UAV 502 may be configured to receive multiple gestures from one or more humans and take one or more actions in response.

After adjusting the flight path 510 of the UAV 502 at the location 2, if necessary, the UAV 502 may continue along the flight path 510 to location 3. At or around this point, the flight path 510 of the UAV 502 intersects the circle 508. In some examples, the occurrence of this intersection may trigger a change in the UAV 502 from coarse positioning to fine positioning. Examples of fine positioning may include: network-based navigation (e.g., using network signals), use of visual markers (e.g., scanning by the UAV 502 for physical markers), beacon search (e.g., scanning by the UAV 502 for one or more signals from one or more beacons or devices), human gestures (e.g., scanning by the UAV 502 for one or more human-based gestures), hardware connection (e.g., scanning by the UAV 502 for one or more connections with a hardware device, perhaps of the human user), and other methods and techniques for fine positioning. In some examples, when operating according to fine positioning, the UAV 502 may operate so as to be more aware of or receptive to human gestures. For example, the UAV 502 may turn on additional and/or supplemental sensing devices to receive human gestures. Near the location 3 is located neighboring house 514 and neighbor 516 in front of the neighboring house 514. In some examples, as the neighboring house 514 is within the circle 508, the UAV 502 may approach the neighboring house 514 (and indirectly the neighbor 516) seeking human gestures, beacons, and the like as part of fine positioning. In this example, the neighbor 516 is not expecting delivery of a package by the UAV 502, and does not therefore expect to see the UAV 502. Accordingly, when the UAV 502 flies nearby the neighbor 516, he may make one or more gestures in the direction of the UAV 502. These gestures may include visual gestures, audible gestures, and other gestures capable of recognition by the UAV 502, indicating that the UAV 502 fly away. In some examples, the UAV 502 may process at least one gesture or all gestures in order to determine at least one action to take. In this example, the action may result in an adjustment of the UAV's behavior, e.g., an adjustment to the trajectory of the flight path 510 in a direction away from the neighboring house 514. In addition to adjusting the flight path 510, based on the interaction with the neighbor 516, the UAV 502 may continue with fine positioning because it has yet to identify and/or arrive at the delivery location 506. Trajectory adjustments may include a change in direction of the UAV 502, a change in height of the UAV 502, and/or a change in speed of the UAV.

The UAV 502 may continue along the flight path 510 until it approaches the delivery location 506 at location 4. In some examples, the human user 518 may be able to interact with the UAV 502 using one or more specific gestures or general gestures. For example, these gestures may have been provided to the human user 518 as part of delivery instructions. In some examples, the UAV 502 is capable of recognizing any appropriate gesture indicating a desire that the UAV 502 approach the person making the gesture. In some examples, the UAV 502 is directed to the delivery location 506 after switching to fine positioning and/or connecting with a device of the human user 518. For example, the human user 518 may have a "UAV directional device" that includes identifying information and was provided to the human user 518 in connection with delivery scheduling. The UAV 502 may be configured to access the identifying information and, after verifying the information, may fly to the location of the UAV directional device. In some examples, the human user 518 may use a personal user device to direct the UAV 502 in a similar manner as described above. For example, the human user 518 may use a mobile phone to indicate its location. In some examples, once the UAV 502 has identified the delivery location 506, it may trigger a change from fine positioning to delivery decision making. During delivery decision making, the UAV 502 may validate the identity of the human user 518 and determine a method for delivery of the package to the human user 518. Once the UAV 502 has validated the identity of the human user 518 and determined a method for delivery, it may deliver the package. Once completed, the UAV 502 may follow the flight path 510 back to the vehicle 504 (location 5). If while flying from location 4 to location 5, the UAV 502 were to encounter humans, it would be capable of receiving human gestures and adjusting its behavior, e.g., adjusting the trajectory of its flight plan or performing some other action related to fulfilling its delivery plan. Thus, in some examples, the UAV 502 may receive human gestures and engage in human interaction at any and all points along the flight path 510. It may be desirable to ensure the safety of human bystanders during any such interactions while the UAV 502 travels along its flight path.

In some examples, the flight path 510 and the interactions with the human users along the flight path may be retained in memory of the UAV 502. Based on these interactions, the UAV 502, or other computer device capable of communicating with the UAV 502, may add to the gestures already included in the gesture repository or database, improve the accuracy of the UAV 502 in responding to human gestures, and develop ways for the UAV 502 to act in future situations with similar gestures. At least some of these acts may be implemented using one or more suitable machine learning techniques. For example, using one or more classifiers or support vector machines a set of gestures may be developed (e.g., the gestures stored in a gesture database). Initially, the set of gestures may be based on one or more training/ learning data sets. The set of gestures may be developed and added to as the data set according to which the machine learning techniques are being implemented. In this manner, patterns between certain gestures can be recognized and used to improve gesture recognition. In addition, the UAV 502 may be configured to receive human gestures in a learning context. In some examples, when in the learning context, a human operator may interact with the UAV 502 in order to "teach" the UAV 502 how to react given certain gestures, circumstances, and the like. In this manner, the UAV 502, or other device, may be able to update a gesture repository or database.

Figure 6:
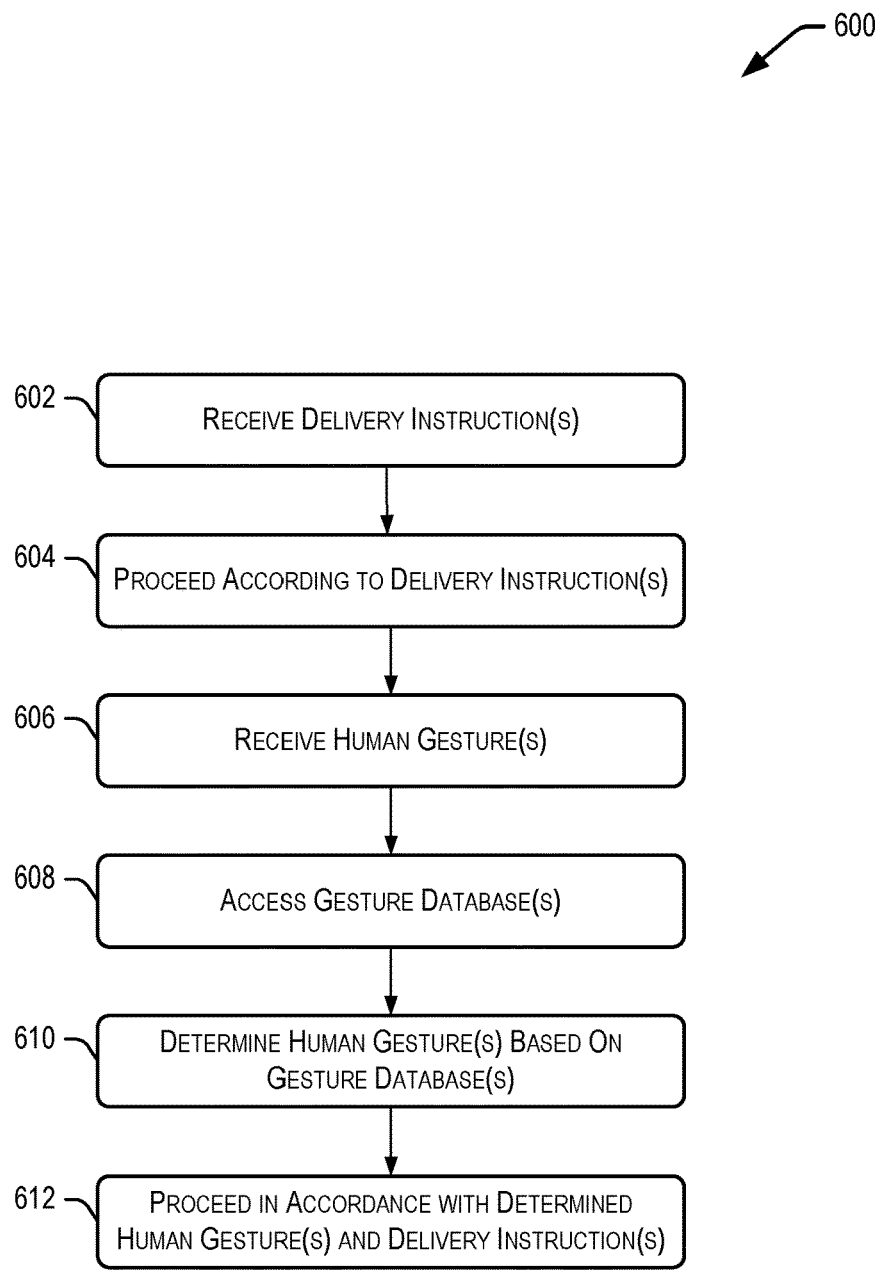
FIG. 6 is a flow diagram depicting example acts for implementing techniques relating to human interaction with unmanned aerial vehicles as described herein, according to at least one example.

Turning next to example acts and/or procedures that may be performed using techniques described herein, in accordance with at least one example. FIG. 6 depicts process 600 including example acts for techniques relating to human interaction with unmanned aerial vehicles in accordance with at least one example. Some or all of the process 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The UAV management module 318 (FIG. 3) of the onboard computer 312 (FIG. 3) may perform the process 600 of FIG. 6. The process 600 begins at 602 by receiving delivery instruction(s). In some examples, receiving delivery instruction(s) may be performed by the communication component 404 (FIG. 4). The delivery instructions may be instructions created by the UAV management module 318, the management module 302 (FIG. 3), an electronic marketplace, or other service overseeing the delivery of packages using the UAV 200 (FIG. 2). The instructions may include a delivery plan. In some examples, a delivery plan may include coarse positioning instructions, fine positioning instructions, and delivery decision making instructions. At 604, the process 600 proceeds according to delivery instruction(s). In some examples, proceeding according to delivery instructions may be performed by the navigation component 406 (FIG. 4). Proceeding according to delivery instructions may include proceeding according to a portion of the delivery plan and enabling the UAV 200 to proceed towards a delivery location. At 606, the process 600 receives human gesture(s). Receiving human gesture(s) may be performed by one or more sensors of the UAV 200 and processed by the gesture determination component 408 (FIG. 4). In some examples, receiving human gestures may include receiving visual gestures, audible gestures, and other gestures capable of recognition by the UAV 200. Examples of gestures that may be received include: voice gestures, arm gestures, multiple-arm gestures, hand gestures, multiple-hand gestures, body gestures (e.g., backing away from the UAV 200, walking toward the UAV 200, and other similar body gestures), natural reaction gestures (e.g., the gestures that a human would naturally make in responding to particular stimuli), pre-defined gestures, flag gestures, sign gestures, static gestures, and other gestures capable of signaling the UAV 200. At 608, the process 600 accesses gesture database(s). In some examples, accessing gesture databases may be performed by the gesture determination component 408. In some examples, a gesture database is stored locally on the UAV 200 and the gesture determination component 408 accesses it locally. The gesture database also may be accessed remotely from the management module 302 (FIG. 3). Accessing gestures databases may include accessing gesture information describing gestures, and searching for one or more gestures, or one or more groups of gestures, similar to gestures received at 606. At 610, the process 600 determines human gesture(s) based on gesture database(s). In some examples, the gesture determination component 408 (FIG. 4) may determine human gestures. Determining human gestures may include comparing received gestures with those accessed at 608 to identify at least one match. Thus, determining human gestures may include determining with respect to a comparison of human gestures. In some examples, determining human gestures may include determining one or more possible meanings of a received gesture and comparing the one or more possible meanings with those included in the gestures database. In some examples, determining human gestures may include utilizing one or more gesture recognition algorithms (e.g., 3D model-based algorithms, skeletal-based algorithms, appearance-based models, and similar algorithms capable of determining human gestures). At 612, the process 600 proceeds in accordance with determined human gesture(s) and delivery instruction(s). In some examples, proceeding in accordance with determined human gestures and delivery instructions may be performed by the delivery component 410 (FIG. 4) and the navigation component 406. Proceeding in accordance with determined human gestures may include adjusting a behavior of the UAV 200, e.g., affecting or implementing a trajectory adjustment to a flight path by instructing one or more systems of the UAV 200 to make the adjustments. In some examples, proceeding in accordance with delivery instructions may include changing from one portion of the delivery plan to another. It also may also include executing delivery of the packages. In some examples, proceeding in accordance with determined human gestures and delivery instructions may include adjusting the behavior of the UAV 200 such that UAV 200 aborts its delivery plan. For example, if at 610, the process 600 determined that the received human gestures indicate that the UAV 200 should abort its delivery plan, then the UAV 200 may abort its delivery plan. In some examples, it may be determined that the UAV 200 should abort its delivery plan without receiving human gestures. For example, the UAV 200 may receive a message from a management module instructing it to abort its mission.

Figure 7:
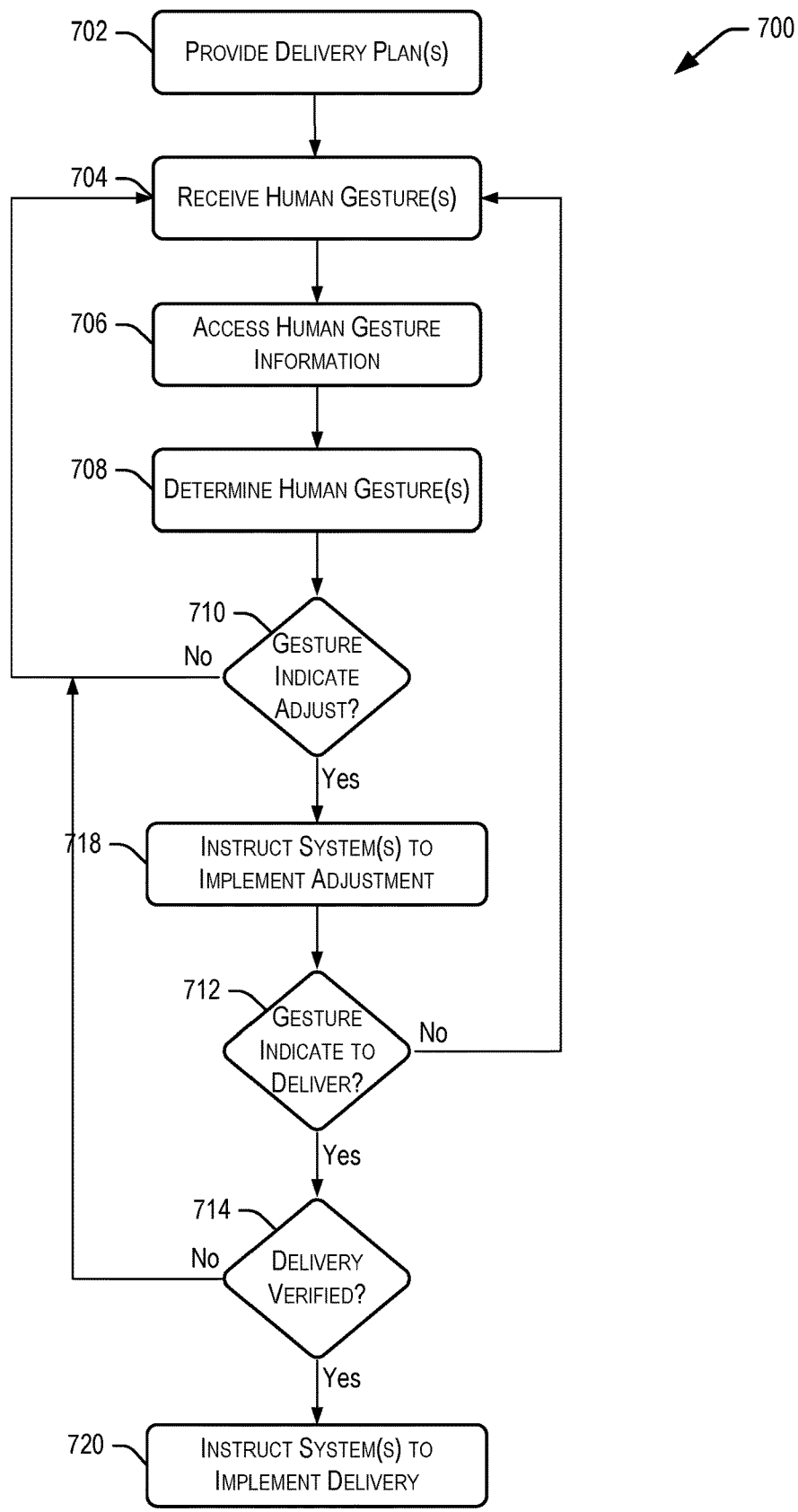
FIG. 7 is a flow diagram depicting example acts for implementing techniques relating to human interaction with unmanned aerial vehicles as described herein, according to at least one example.

Turning next to example acts and/or procedures that may be performed using techniques described herein, in accordance with at least one example, FIG. 7 depicts process 700 including example acts for techniques relating to human interaction with unmanned aerial vehicles in accordance with at least one example. The server management module 336 (FIG. 3) of the management module 302 (FIG. 3) may perform the process 700 of FIG. 7. The process 700 begins at 702 by providing delivery plan(s). In some examples, providing delivery plan(s) may be performed by the server management module 336. Providing delivery plans may include providing one or more portions of a delivery plan to the UAV 200 (FIG. 2). The delivery plan may include one or more portions (e.g., coarse positioning portion, fine positioning portion, delivery instruction portion, and similar portions relating to the delivery plan). In some examples, certain portions may be specific for delivery of a particular package to a user. For example, a delivery instruction portion may include identifying information specific to the user (e.g., name, address, delivery preferences, and other similar user information). In some examples, certain portions of the delivery plan may include more generic information (i.e., details about a delivery plan that are shared by more than one user). For example, the delivery plan may include generic information describing details about a particular neighborhood where the UAV 200 will be flying. This generic information may be reused and added to as the UAV 200 obtains more experience with certain routes, neighborhoods, areas, and the like. At 704, the process 700 receives human gesture(s). In some examples, receiving human gesture(s) may be performed by the gesture determination component 408 (FIG. 4) of the UAV 200. Receiving human gestures may include scanning for gestures using one or more sensors of the UAV 200, receiving information indicating the presence of a gesture, and determining, based on the received information, details about the gesture. At 706, the process 700 accesses human gesture information or database. In some examples, accessing human gesture information may be performed by the server management module 336. Accessing human gesture information may include accessing one or more data structures or databases in which gesture information is retained. At 708, the process 700 determines human gesture(s). In some examples, determining human gestures may be performed by the server management module 336. Determining human gestures may include comparing the received human gestures with the accessed human gesture information. At 710, a decision is made whether determined gesture(s) indicate to implement a behavior adjustment. In some examples, a determined gesture may indicate that the UAV 200 adjust its behavior such that the UAV 200 no longer proceeds according to its delivery plan (e.g., to abort the delivery plan). In some examples, a determined gesture may indicate that the UAV 200 perform one or more routines or subroutines in order to determine a next step to take. For example, a determined gesture may indicate that the UAV 200 fly to a certain elevation and request additional instructions from a management module or wait for a period of time before flying along the same path. In some examples, a determined gesture may indicate that the UAV 200 continue along the flight path in the direction of the target location. If the determined gesture indicates that the UAV 200 should not adjust its behavior (i.e., "no"), then the process 700 returns to block 704 to receive human gesture(s). If the determined gesture indicates that the UAV 200 should adjust its behavior (i.e., "yes"), then at 718, the process 700 instructs system(s) to implement or affect a behavior adjustment. In some examples, instructing systems to implement or affect a behavior adjustment may include sending instructions to the UAV 200 to instruct its systems to implement or affect the behavior adjustment. As discussed above, implementing a behavior adjustment may encompass aborting the entire mission, aborting a portion of the delivery plan, adjusting the delivery plan, adjusting the flight path of the UAV 200, and other similar adjustments. At 712, a decision is made whether gesture(s) indicate to deliver. If no, then the process 700 returns to block 704 to receive human gesture(s). If yes, then the process 700 proceeds to decision block 714. At 714, a decision is made whether delivery is verified. In some examples, verifying deliveries may be performed by the delivery component 410. Verifying deliveries may include verifying the identity of a recipient of a package. For example, the process 700 may verify using one or more methods for verification discussed herein. In some examples, a remote operator may connect to the UAV 200 and communicate with the recipient or the UAV 200 may communicate with the recipient using its speech recognition and interpretation functionality. As mentioned previously, the delivery may be verified by verifying the identity of the recipient using a user device, a scanner, a machine-readable code, specialized device, and other similar methods of verification. If the answer is yes at 714, then the process 700 proceeds to 720. At 720, the process instructs system(s) to implement or affect delivery. In some examples, this may include providing instructions to the UAV 200 to implement or affect delivery by landing and/or releasing the package.

Figure 8:
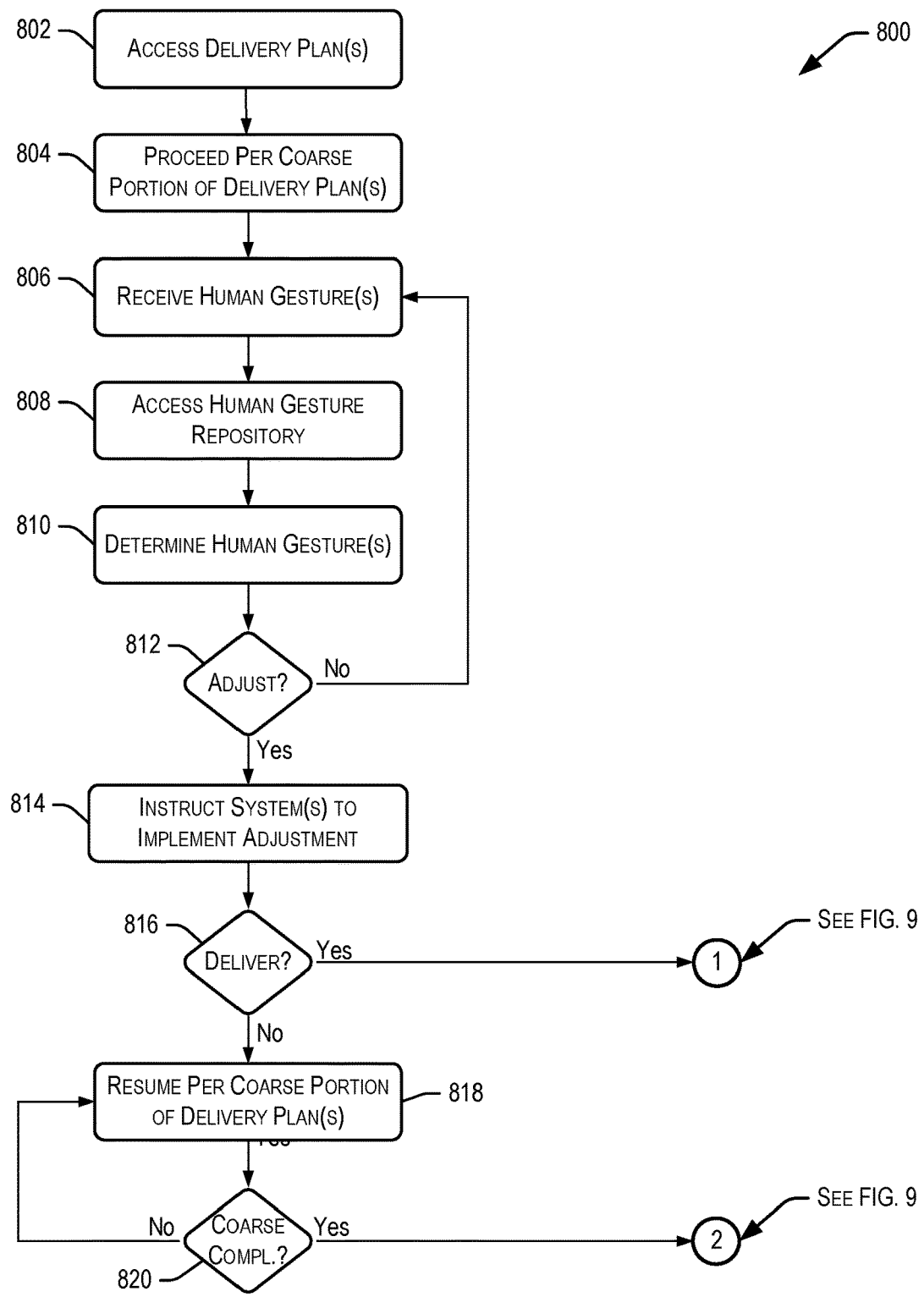
FIG. 8 is a flow diagram depicting example acts for implementing techniques relating to human interaction with unmanned aerial vehicles as described herein, according to at least one example.

Turning next to example acts and/or procedures that may be performed using techniques described herein, in accordance with at least one example, FIG. 8 depicts process 800 including example acts for techniques relating to human interaction with unmanned aerial vehicles in accordance with at least one example. The UAV management module 318 (FIG. 3) of the onboard computer 312 (FIG. 3) may perform the process 800 of FIG. 8. The process 800 begins at 802 by accessing delivery plan(s). In some examples, accessing delivery plans may be performed by the communication component 404 (FIG. 4). Accessing delivery plans may include receiving a delivery plan including a plurality of portions. In some examples, the portions that may be received include: a coarse portion, a fine portion, and a delivery portion. At 804, the process proceeds according to the coarse portion of the delivery plan. In some examples, proceeding according to the coarse portion of the delivery plan may be performed by the navigation component 406 (FIG. 4). Proceeding according to the coarse portion may include navigation based on GPS systems. At 806, the process 800 receives human gesture(s). In some examples, receiving human gestures may be performed by the gesture determination component 408 (FIG. 4). At 808, the process 800 accesses human gesture repository or database. In some examples, accessing human gesture repository may be performed by the gesture determination component 408. At 810, the process 800 determines human gestures. Determining human gestures may be performed by the gesture determination component 408. At 812, a decision is made whether to adjust. In some examples, this decision may be made by the gesture determination component 408. Determining whether to adjust may be based on the determination of human gestures performed at 810. If no, then the process 800 returns to 806 to receive human gestures. If, for example, a determined human gesture indicates that the UAV 200 (FIG. 2) should adjust its behavior (i.e., "yes"), e.g., adjusting delivery plan, making a trajectory adjustment, or other adjustments to its behavior, then at 814, the process 800 instructs system(s) to implement or affect an adjustment. In some examples, instructing system(s) to implement or affect the adjustment may be performed by the communication component 404. In some examples, if the behavior adjustment is that the UAV 200 should abort its mission, then the UAV 200 may, in some examples, return to its source location, send a message to a management module (e.g., requesting retrieval, indicating that it is aborting, requesting authorization to abort, requesting further instructions, and other similar messages), issue an alarm, send a message to recipient, and other similar actions. At 816, a decision is made whether to deliver. In some examples, this decision may be made by the delivery component 410 (FIG. 4). In some examples, a package may not be delivered until the delivery is verified. If yes, then the process continues to FIG. 9 at encircled "1." If no, then at 818, the process 800 resumes according to the coarse portion of the delivery plan(s). Thus, if the process 800 determines not to adjust and not to proceed with delivery (and it has not changed to a different portion of the delivery plan), then the process 800 continues according to the coarse portion of the delivery plan. At 820, a decision is made whether the coarse portion of the delivery plan is complete. If no, then the process 800 continues back to block 818 and resumes according to the coarse portion of the delivery plan. If yes, then the process continues to FIG. 9 at encircled "2."

Figure 9:
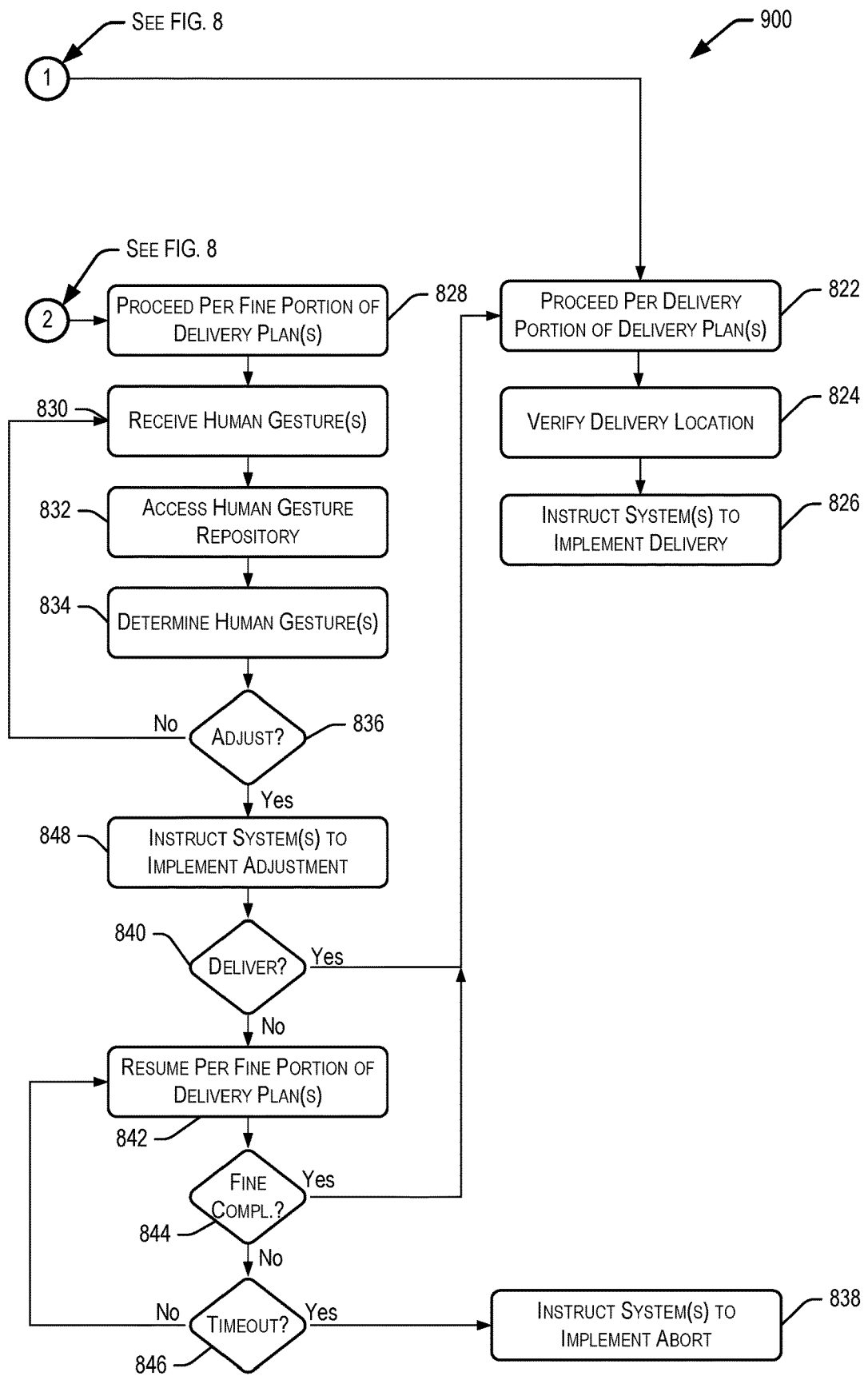
FIG. 9 is a flow diagram depicting example acts for implementing techniques relating to human interaction with unmanned aerial vehicles as described herein, according to at least one example.

Picking up at the encircled "1" on FIG. 9, the process 800 continues to 822. At 822, the process 800 proceeds according to the delivery portion of the delivery plan(s). In some examples, proceeding according to the delivery portion of the delivery plans may be performed by the delivery component 410. Proceeding according to the delivery portion of the delivery plans may include changing from the coarse portion to the delivery portion. At 824, the process 800 verifies delivery. In some examples, verifying delivery may be performed by the delivery component 410. Verifying delivery may include verifying a recipient associated with the delivery, verifying a location associated with the delivery, and verifying other aspects of the delivery. At 826, the process 800 instructs system(s) to implement or affect delivery. In some examples, instructing systems to implement or affect delivery may be performed by the delivery component 410. Instructing systems to implement or affect delivery may include instructing a system of the UAV 200 to take one or more actions, for example, instructing the retaining system to release a package. Returning to the encircled "2" on FIG. 9, the process 800 continues to 828. At 828, the process 800 proceeds according to the fine portion of the delivery plan(s). In some examples, proceeding according to the fine portion of the delivery plans may be performed by the navigation component 406. Proceeding according to the fine portion may include receiving information indicating that a coarse portion of the delivery plan is completed or substantially completed, determining based on the information to change to a fine portion, and instructing systems of the UAV 200 to proceed according to the fine portion. At 830, the process 800 receives human gesture(s). In some examples, receiving human gestures may be performed by the gesture determination component 408. At 832, the process 800 accesses human gesture repository or database. In some examples, accessing human gesture repository may be performed by the gesture determination component 408. At 834, the process 800 determines human gestures. In some examples, determining human gestures may be performed by the gesture determination component 408. At 836, a decision is made whether to adjust. In some examples, this decision may be made by the gesture determination component 408. Determining whether to adjust may be based on the determination of human gestures performed at 834. If no, then process 900 returns to 830 to receive human gestures. If, for example, a determined human gesture indicates that the UAV 200 should adjust its behavior (i.e., "yes"), e.g., by adjusting its delivery plan, by making a trajectory adjustment, or by making other adjustments to its behavior, then at 848, the process 800 instructs system(s) to implement or affect the adjustment. In some examples, instructing system(s) to implement or affect the adjustment may be performed by the communication component 404. In some examples, if the behavior adjustment is that the UAV 200 should abort its mission, then the UAV 200 may, for example, return to its source location, send a message to a management module (e.g., requesting retrieval, indicating that it is aborting, requesting authorization to abort, requesting further instructions, and other similar messages), issue an alarm, send a message to recipient, and other similar actions. At 840, a decision is made whether to deliver. In some examples, this decision may be made by the delivery component 410. In some examples, a package may not be delivered until the delivery is verified. If yes, then at 822, the process 800 proceeds according to the delivery portion of the plan(s). If no, then process 800 continues to 842. At 842, the process 800 resumes according to the fine portion of the delivery plan(s). In some examples, resuming according to the fine portion of the delivery plans may be performed by the navigation component 406. Resuming according to the fine portion of the delivery plan may include beginning at the same point in the delivery plan prior to receiving human gestures at 830. At 844, a decision is made whether the fine portion of the delivery plan is complete. If yes, then at 822, the process proceeds according to the delivery portion of the plan(s). If no, then at 846, a decision is made whether the delivery plan (including the fine portion) has timed out. If no, then at 842, the process 800 resumes according to the fine portion of the delivery plan(s). If yes, then at 838, the process 800 instructs systems to implement or affect abort. In some examples, implementing or affecting abort, may include the UAV 200 returning to its source location, sending a message to a management module (e.g., requesting retrieval, indicating that it is aborting, requesting authorization to abort, requesting further instructions, and other similar messages), issuing an alarm, sending a message to recipient, and performing other similar actions. In some examples, the fine portion (or any other portion of the delivery plan) may timeout if the UAV 200 is unable to deliver its package. This may be a result of any number of factors, such as, an incorrect address, inclement weather, third-party interference, UAV malfunction, inability to verify recipient, and any other factor that could cause delay.

As can be appreciated from the foregoing discussion, a UAV, such as UAV 200, may be configured to receive and process human gestures at any suitable point along its path, whether or not its mission has been aborted. The UAV 200 may also receive and process human gestures while executing any suitable portion of its delivery plan, whether or not previous behavioral adjustments have been made. Thus, human gestures may be received at other times and in different manners than the examples illustrated in FIGS. 8 and 9. In some examples, the UAV 200 may be configured to scan (via its sensors) for gestures continuously, periodically, and/or randomly. The frequency of such scanning may be increased and/or decreased at certain points along the path and/or under certain circumstances. For example, scanning may be less frequent when the UAV is traversing a less densely inhabited area but more frequent when in a densely inhabited area. As an additional example, scanning may be less frequent when the UAV is performing one portion of the delivery plan compared to another.

Figure 10:
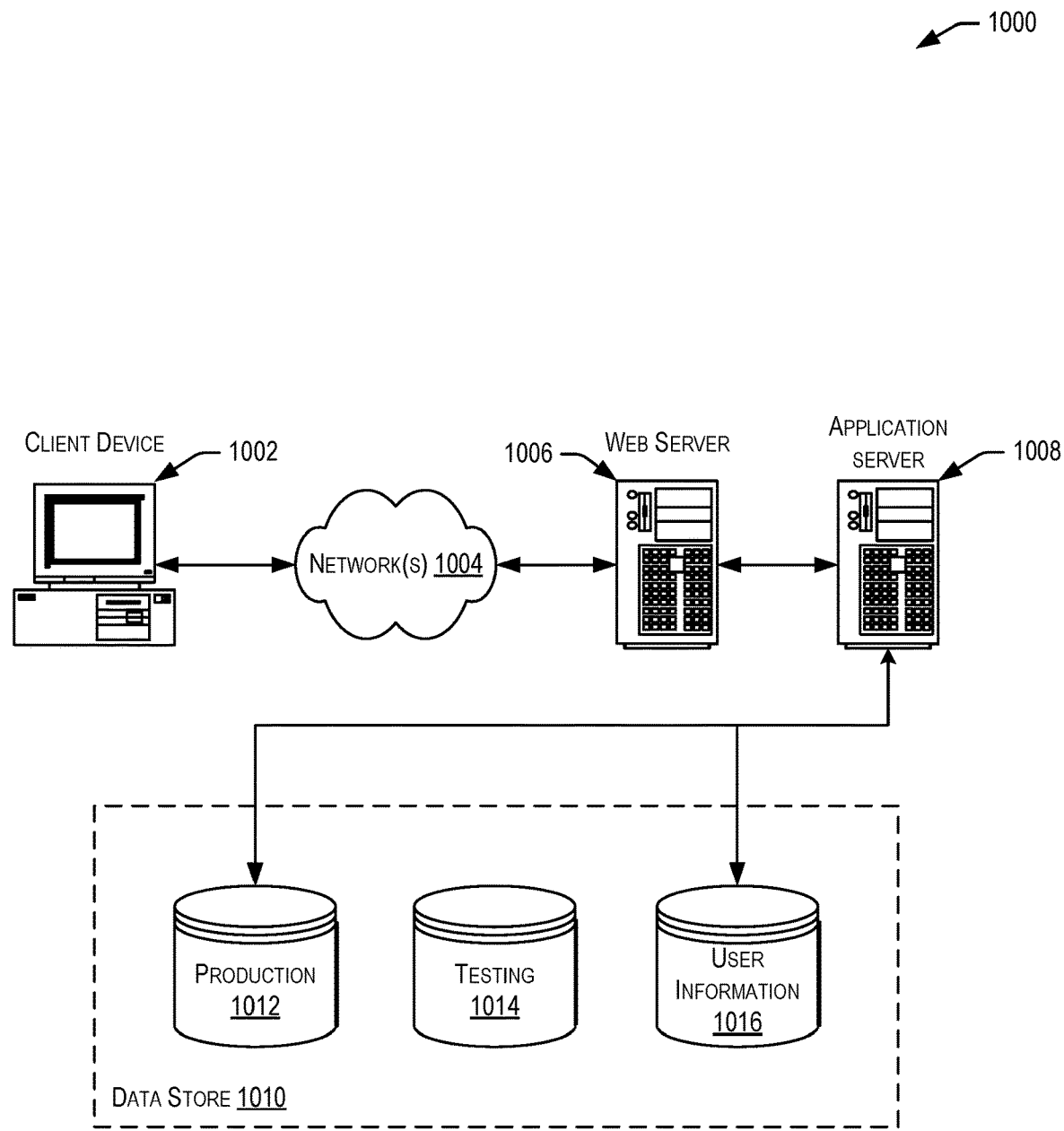
FIG. 10 is an example schematic environment in which various embodiments for implementing techniques relating to human interaction with unmanned aerial vehicles can be implemented.

FIG. 10 illustrates aspects of an example schematic environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any suitable device operable to send and receive requests, messages or information over a suitable network 1004 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for accessing requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response to requests from user devices, such as by executing one or more Web applications that may be implemented as one or more scripts or programs written in any programming language, such as Java °, C, C # or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any suitable medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An unmanned aerial vehicle, comprising:
   a propulsion system configured to propel the unmanned aerial vehicle;
   a communication system configured to receive human gesture input; and
   an onboard management system in communication with the propulsion system and the communication system, the onboard management system configured to at least:
      receive, via the communication system, gesture input comprising a visual gesture by a human user;
      access gesture information describing one or more visual gestures capable of being recognized by the communication system;
      determine, based on the gesture input and the gesture information, an action for performance by the unmanned aerial vehicle; and
      cause the unmanned aerial vehicle to perform the action.

2. The unmanned aerial vehicle of claim 1, wherein the action comprises at least one of a first trajectory action performed by the propulsion system that causes the unmanned aerial vehicle to move toward the human user, a second trajectory action performed by the propulsion system that causes the unmanned aerial vehicle to move away from the human user, or a communication action performed by the communication system.

3. The unmanned aerial vehicle of claim 1, wherein the communication system comprises an onboard light sensor comprising at least one of a visible light camera, an infrared camera, an RGB camera, a depth sensor, or an ultraviolet sensitive camera, and the gesture input is received via the onboard light sensor.

4. The unmanned aerial vehicle of claim 1, wherein:
   the gesture information is stored in a gesture database local to the onboard management system; and
   accessing the gesture information comprises accessing the gesture information from the gesture database.

5. An apparatus, comprising:
   a frame;
   a propulsion device connected to the frame;
   a sensor device configured to detect visible human gestures; and
   a management system in communication at least with the sensor device, the management system configured to at least:
      instruct the propulsion device to move the apparatus according to a flight plan;
      receive sensor information from the sensor device while the apparatus is moving according to the flight plan, the sensor information associated with a visible human gesture;
      compare the sensor information with information from an onboard gesture database to identify the visible human gesture;
      determine, based at least in part on the visible human gesture, an associated action for performance by the apparatus; and
      cause the apparatus to perform the associated action.

6. The apparatus of claim 5, wherein the onboard gesture database is configured to store information about a plurality of visible human gestures capable of being identified by the management system.

7. The apparatus of claim 5, wherein:
   the sensor information is first sensor information, the visible human gesture is a first visible human gesture, and the associated action is a first associated action; and
   the management system is further configured to at least:
      receive, via the sensor device, second sensor information after performance of the first associated action, the second sensor information associated with a second visible human gesture;
      determine, based at least in part on the second visible human gesture, a second associated action for performance by the apparatus, the second associated action being distinct from the first associated action; and
   cause the apparatus to perform the second associated action.

8. The apparatus of claim 7, wherein the first associated action results in the apparatus moving closer to a human user and the second associated action results in the apparatus moving further from the human user.

9. The apparatus of claim 5, wherein the visible human gesture is made by a human user associated with the apparatus.

10. The apparatus of claim 9, wherein the human user is associated with the apparatus based at least in part on a verification of an identity of the human user.

11. The apparatus of claim 9, wherein the associated action controls a subsystem of the apparatus comprising a propulsion system that includes the propulsion device or a communication system that includes the sensor device.

12. The apparatus of claim 5, wherein the visible human gesture comprises a hand gesture, a multiple-hand gesture, an arm gesture, a multiple-arm gesture, or a combined hand and arm gesture.

13. The apparatus of claim 5, wherein the sensor device comprises a plurality of cameras.

14. The apparatus of claim 5, wherein the flight plan comprises a predefined routine.

15. The apparatus of claim 5, wherein the associated action comprises a predefined routine.

16. The apparatus of claim 5, wherein:
   the sensor information is associated with a plurality of visible human gestures including the visible human gesture; and
   comparing the sensor information with the information from the onboard gesture database to identify the visible human gesture comprises comparing the sensor information with the information from the onboard gesture database to identify the visible human gesture from among the plurality of visible human gestures.

17. The apparatus of claim 16, wherein identifying the visible human gesture from among the plurality of visible human gestures is based at least in part on one or more of a number of common gestures in the plurality of visible human gestures, a ranking of the plurality of visible human gestures, or a weighting of the plurality of visible human gestures.

18. A computer-implemented method, comprising:
   receiving, by an onboard computer of an aerial vehicle, first information about a visible human gesture;
   accessing, by the onboard computer and from a data repository, second information about a plurality of visible human gestures;

determining, by the onboard computer, an action for the aerial vehicle based at least in part on the first information and the second information; and causing, by the onboard computer, the aerial vehicle to perform the action.

19. The computer-implemented method of claim 18, wherein the first information is received while the aerial vehicle is airborne.

20. The computer-implemented method of claim 18, wherein determining the action for the aerial vehicle comprises comparing the first information with the second information at least until a matching visible human gesture is identified among the plurality of visible human gestures, the matching visible human gesture matching the visible human gesture.

* * * * *